Oct. 26, 1965     J. E. MARTIN ETAL     3,213,606
ACTUATOR APPARATUS
Filed Aug. 20, 1962     2 Sheets-Sheet 1
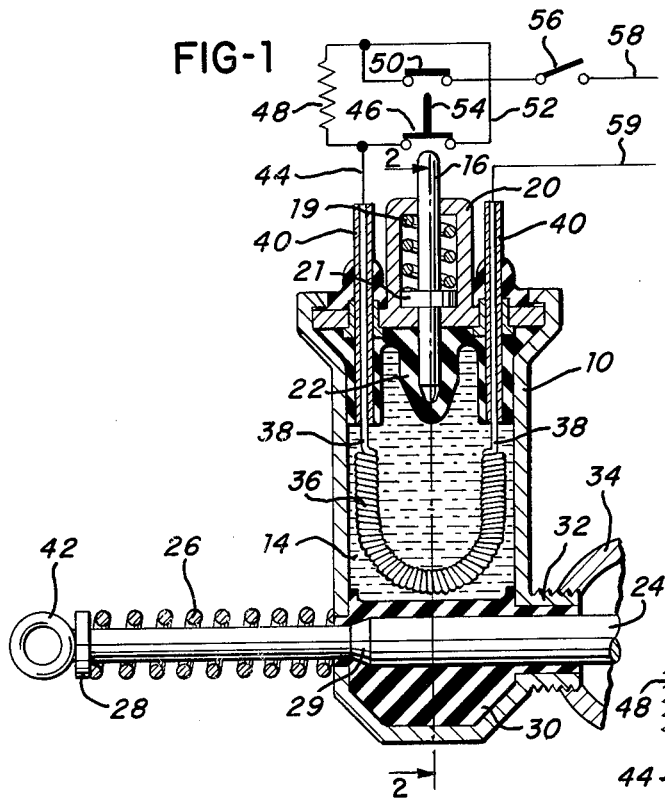
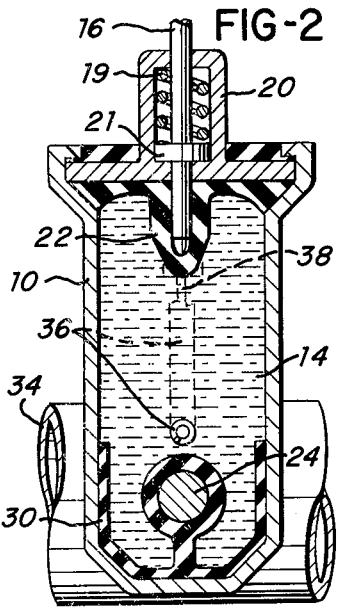
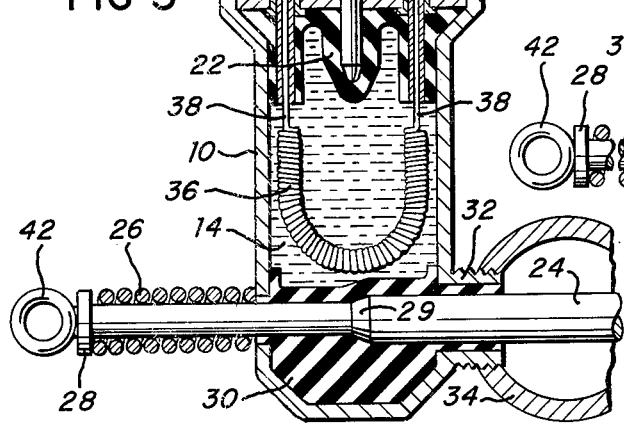
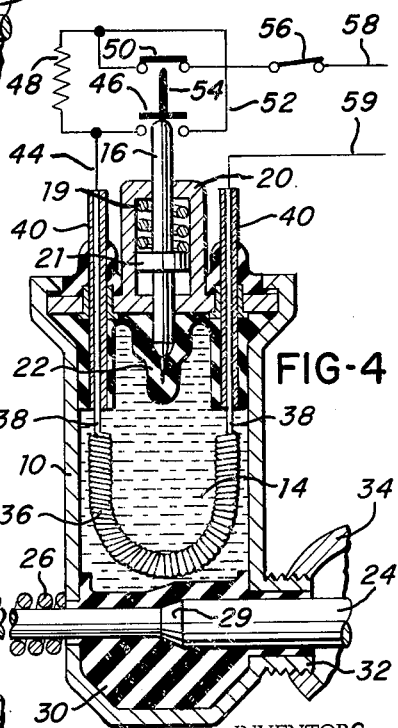
INVENTORS
JOHN E. MARTIN &
WAYNE H. SCHUTMAAT
BY William R. Jacox
ATTORNEY U̇nited States Patent Office 3,213,606
Patented Oct. 26, 1965

3,213,606
ACTUATOR APPARATUS
John E. Martin, Natick, and Wayne H. Schutmaat, Needham, Mass., assignors to Standard-Thomson Corporation, Waltham, Mass., a corporation of Delaware
Filed Aug. 20, 1962, Ser. No. 218,060
1 Claim. (Cl. 60—23)

This invention relates to actuator apparatus. The invention relates more particularly to actuator apparatus which includes thermally responsive means for operation thereof.

An object of this invention is to provide actuator apparatus in which operation may be accurately controlled.

Another object of this invention is to provide actuator apparatus which is capable of performing high values of work in consideration of the physical size thereof.

Another object of this invention is to provide means by which a single actuator unit is capable of performing a series of operations in a given controlled sequence.

Another object of this invention is to provide actuator apparatus having means for limiting the maximum forces exerted thereby while permitting accurate control of such forces throughout an operating range thereof.

Another object of this invention is to provide control apparatus for operation of a valve member or the like within a fluid conduit, which includes sealing means for preventing flow of fluid between the control apparatus and the conduit.

Another object of this invention is to provide actuator means which is capable of moving a load to a given position and is also capable of retaining the load in such position.

Other objects and advantages reside in the construction of parts, the combination thereof, the method of manufacture, and the mode of operation, as will become more apparent from the following description.

In the drawings:

FIGURE 1 is a sectional and diagrammatic view of actuator apparatus of this invention.

FIGURE 2 is a sectional view taken substantially on line 2—2 of FIGURE 1.

FIGURE 3 is a sectional and diagrammatic view similar to FIGURE 1 but showing the actuator apparatus in a position of operation.

FIGURE 4 is a sectional and diagrammatic view similar to FIGURES 1 and 3 but showing the actuator apparatus in another position of operation.

Figure 5:
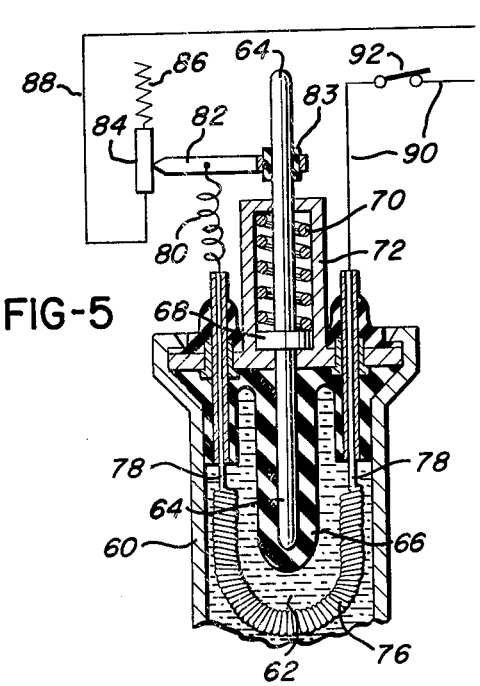
FIGURE 5 is a sectional and diagrammatic view of a modification of the actuator apparatus of this invention.

Referring to the drawings in detail, the actuator apparatus of FIGURES 1, 2, 3, and 4 includes a container 10 within which is disposed a quantity of thermally responsive expansible-contractible material 14. The material 14 may be any element or combination of elements which gives the material a suitable coefficient of expansion over a given temperature range.

A control rod 16 has a portion thereof within the container 10 and a portion thereof exterior of the container 10. The control rod 16 is axially movable and is biased toward the container 10 by a compression spring 19 which engages an auxiliary housing 20 of the container 10 and which also engages a collar 21 of the rod 16. An elastomeric sealing member 22 is shown separating the control rod 16 from the thermally responsive material 14. Such a sealing member may be necessary with certain types of thermally responsive materials.

An axially movable actuator rod 24 is shown extending through the container 10. The rod 24 is biased toward the left, as shown in FIGURES 1, 3, and 4 by a compression spring 26 which is disposed between the container 10 and a collar 28 of the rod 24. The rod 24 has a tapered abutment or engagement portion 29. A sealing member 30 is shown in separating relation between the rod 24 and the thermally responsive material 14 and may be required to prevent leakage of the material 14 from the container 10.

The container 10 has a threaded adapter portion or connector portion 32 which is shown threadedly disposed within an opening of a wall 34 of a fluid conduit or the like. Thus, the rod 24 may be connected to any suitable element within the conduit for operation thereof. The adapter portion or connector portion 32 makes possible sealing relation with the wall 34 for prevention of escape of fluid through the wall 34 while permitting the rod 24 to operate a valve or the like (not shown) which is disposed within the conduit.

Also within the container 10 and within the thermally responsive material 14 is an electric heater unit 36. The heater unit 36 has terminal wires 38 extending through suitable insulator members 40 to the exterior of the container 10. One of the terminal wires 38 connects to a conductor 44 which is connected to one side of a switch 46. The conductor 44 also connects to a resistor or impedance member 48 which is also joined to a switch 50. The resistor 48 is also connected by means of a conductor 52 to an opposite side of the switch 46. The switch 50 is connected in series with a switch 56. A conductor 58 is adapted to join the switch 56 to a source of electrical energy. A conductor 59 is connected to the other lead wire 38 and is adapted to be joined to a source of electrical energy.

OPERATION

The switch 56 may be a control switch of any suitable type which is operated by control means or the like or which is manually operated. When the switch 56 is closed, electrical energy flows into the heater unit 36, causing heating thereof. Such heating causes heating of the thermally responsive material 14. When the temperature of the material 14 reaches a predetermined value, there is a high rate of expansion thereof.

Such expansion of the material 14 produces a pressure upon the sealing member 30. The sealing member 30 thus applies a pressure upon the actuator rod 24. Due to the fact that the tapered portion 29 of the rod 24 serves as an engagement surface, expansion of the material 14 causes a pressure to be applied by the sealing member 30 upon the tapered portion 29 which results in axial movement of the rod 24, as illustrated in FIGURE 3. Such axial movement of the rod 24 is against the forces of the spring 26, which becomes further compressed, as shown in FIGURE 3.

Of course, the control rod 16 is also within the container 10 and is subject to the forces of the material 14 during expansion thereof. However, due to the fact that the effective abutment area of the tapered portion 29 of the rod 24 is larger than the area of the rod 16, there is a greater total abutment force upon the rod 24 than upon the rod 16, urging axial movement thereof. Thus, if the force of the spring 19 upon the rod 16 is equal to the force of the spring 26 upon the rod 24, there is movement of the rod 24 before there is movement of the rod 16. In practice, however, the forces of the springs 19 and 26 are not equal. The forces of the springs 19 and 26 are predetermined and established to provide desired individual operation of the rods 24 and 16 at predetermined pressure values of the material 14. The difference between the effective abutment area of the rod 24 and the abutment area of the rod 16 determines the maximum operating force of the rod 24 before the rod 16 moves. The operating force of each rod is dependent upon the effective abutment area thereof and is also dependent upon the pressure of the material 14.

Therefore, as the rod 24 moves to its position as shown in FIGURE 3, it operates any desired element such as a fluid valve or the like which may be located within the conduit of which the wall 34 is a part.

It is to be understood that the container 10 does not necessarily require the connector portion 32. Furthermore, the container 10, is not necessarily attached to a wall or the like, but the container 10 may be supported by any suitable structure. The rod 24 may be operatively connected to any suitable desired element for movement or operation thereof.

The rod 24 is shown as being provided with a ring or loop 42 which may be used for attachment to any suitable desired element for operation or movement thereof with axial movement of the rod 24. Thus, both of the ends of the rod 24 may be used for performing work or for operation or actuation of another element or elements.

As the thermally responsive material continues to be heated and continues to expand, the rod 24 continues to move until a positive stop of any suitable type (not shown) prevents further movement of the rod 24. Thus, the rod 24 may be positioned as shown in FIGURE 3.

However, as long as the switch 56 remains closed, there is heating of the heater unit 36 and additional expansion of the material 14. Such additional expansion of the material 14 results in axial movement of the rod 16.

As the rod 16 moves a small predetermined amount, it causes opening of the switch 46, as shown in FIGURE 4. When the switch 46 is open, the resistor 48 is placed in series relation with the heater unit 36. Thus, the flow of current through the heater unit 36 is greatly reduced. Thus, the rate at which heat is added to the material 14 is greatly reduced. The value of the resistor 48 is selected so that with the switch 46 open, the current flow through the heater unit 36 provides only sufficient heat to the material 14 to maintain a given volume of the material 14 without further expansion thereof beyond that illustrated in FIGURE 4. In other words, in the positions of the elements of the apparatus as shown in FIGURE 4, heat being added to the material 14 is substantially equal to the heat flowing therefrom as the material 14 remains in a desired expanded condition. Thus, the rod 24 is held in an actuated position such as shown in FIGURE 4.

If, for some reason, pressures within the container 10 should increase and the volume of the material 14 should become greater than that shown in FIGURE 4, the rod 16 is moved farther in a direction from the container 10 and a stem 54 of the switch 46 causes opening of the switch 50. When the switch 50 is opened, flow of current to the heater unit 36 ceases. Thus, the material 14 is permitted to cool.

FIGURE 5

FIGURE 5 shows actuator apparatus of this invention in which a container 60 retains thermally responsive material 62. A rod 64 has a portion thereof within the container 60. A sealing member 66 separates the material 62 from the rod 64. The rod 64 has a collar 68. A spring 70 is disposed between the collar 68 and an auxiliary housing 72 and urges the rod 64 toward the container 60.

An electric heater unit 76 has terminal wires 78, one of which is connected to a conductor 80 which is joined to a contact finger 82. The conductor 80 is shown as being coiled to permit expansion of the length thereof. The contact finger 82 is carried by the rod 64 and is movable thereby. An insulator member 83 electrically separates the contact finger 82 from the rod 64.

The contact finger 82 normally engages a fixedly positioned contact bar 84. The bar 84 has negligible resistance but has a resistance element 86 connected at one end thereof. A conductor 88 is adapted to connect the bar 84 to a source of electrical energy. A conductor 90 joins the other terminal wire 78, through a switch 92, to the source of electrical energy.

When the switch 92 is closed, the heater unit 76 is heated and causes expansion of the thermally responsive material 62. Sufficient expansion of the material 62 causes movement of the rod 64 in a direction from the container 60. Since the bar 84 has negligible resistance, the contact finger 82 may be moved along the bar 84 without changing the resistance in the circuit to the heater unit 76. However, upon sufficient movement of the rod 64, the contact finger 82 is moved from the bar 84 and into contact with the resistance element 86. Thus, resistance is added to the circuit of the heater unit 76 and the current therethrough is decreased. Thus, the heat dissipated by the heater unit 76 decreases. The rod 64 is thus adjustably moved by expansion and contraction of the material 62.

The rod 64 assumes a position so that the contact finger 82 engages the resistor element 86 to provide a resistance of such a value that the heat added to the material 62 is equal to the heat flowing therefrom. Thus, a desired position of any actuator rod in the container 60 is automatically maintained.

FIGURE 6

Figure 6:
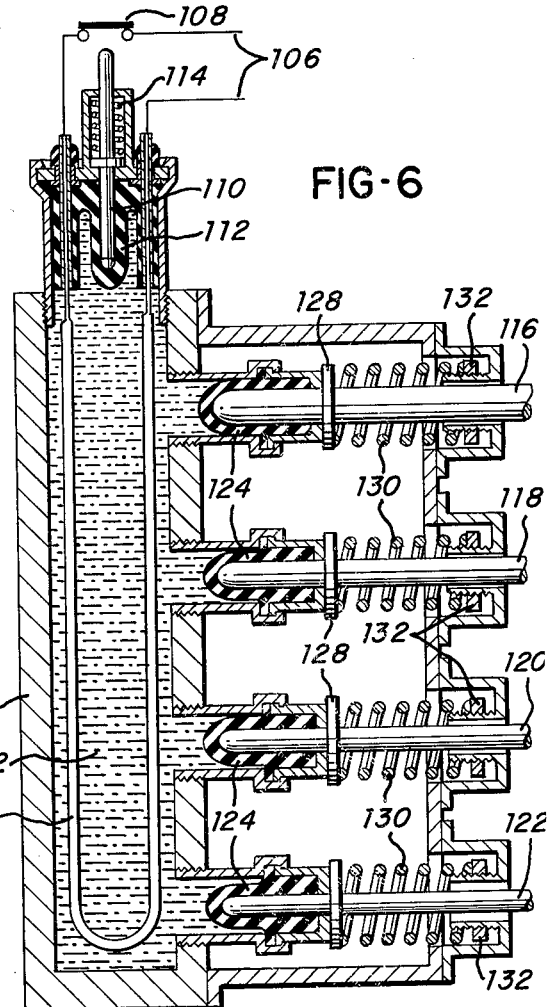
FIGURE 6 is a sectional view showing another actuator apparatus of this invention.

The apparatus of this invention as shown in FIGURE 6 includes a container 100 having thermally responsive material 102 therein. Also, within the container 100 and within the material 102 is an electric heater unit 104 which is joined to external conductors 106, one of which has a switch 108 connected therein. Within the container 100 is a control rod 110 which is encompassed by an elastomeric sealing member 112. The rod 110 extends from the container 100 and is biased toward the container 100 by a spring 114.

Also within the container 100 and extending therefrom are a plurality of actuator rods, herein shown as rods 116, 118, 120, and 122, each of which is shown as having a sealing member 124 in engagement therewith.

Herein each of the rods 116, 118, 120, and 122 has a cross-sectional area different from any of the other rods. The rod 116 is shown as having the largest cross-sectional area and each of the rods 118, 120, and 122 having respectively smaller cross-sectional areas.

Each of the rods 116, 118, 120, and 122 has a collar 128 which is engaged by a spring 130 which is compressed between the collar 128 and an adjustable stop member 132.

When the conductors 106 are connected to a source of electrical energy with the switch 108 closed, the electric heater unit 104 is energized and provides heat to the thermally responsive material 102. Thus, there is expansion of the thermally responsive material 102.

When the material 102 has expanded sufficiently, there is a pressure applied thereby to the rods 110, 116, 118, 120, and 122 toward movement thereof. However, due to the fact that the rod 116 has the largest cross-sectional area or the largest abutment area of any of the rods positioned within the container 100, a greater total pressure is applied to the rod 116 than to any of the other rods. Therefore, the rod 116 moves first. As the material 102 expands the pressure thereof is, of course, equal to the pressure necessary for expansion thereof. Thus, as the rod 116 moves, the pressure within the container 100 is the pressure of the material 102 necessary to move the rod 116 and any load that may be applied to the rod 116. The rod 116 moves until it reaches a positive mechanical stop.

When the rod 116 reaches a positive stop, the pressure within the container 100 caused by the material 102 forces movement of the rod 118, which is the rod within the container 100 which has the next largest abutment area. After the rod 118 comes to a positive stop, the rod 120 moves until it reaches a positive stop. Then the rod 122 moves until it reaches a positive stop. Of course, any load which may be applied to any of the rods 116, 118, 120, and 122 moves therewith.

If, at any time, the pressure and/or volume of the material 102 within the container 100 should become greater than a predetermined value, the rod 110 is moved and causes opening of the switch 108. The heater unit 104 is thus disconnected from the source of electrical energy. Of course, when the switch 108 opens, heating of the heater unit 104 ceases and heating of the material 102 ceases.

By adjustment of the resilient forces of each of the springs 130, the relative pressures required for sequential movement of the rods 116, 118, 120, and 122 and any load applied thereto can be precisely determined. Thus, one of the uses of actuator apparatus of this invention is that of programming or scheduling a series of operations of an element or elements operatively connected to the rods 116, 118, 120, and 122. Any one or all of the rods 116, 118, 120, and 122 may operate any suitable load and/or control mechanism before completion of its movement.

It is to be understood that apparatus of this invention may contain any desired number of actuator rods for sequential movement thereof.

FIGURE 7

Figure 7:
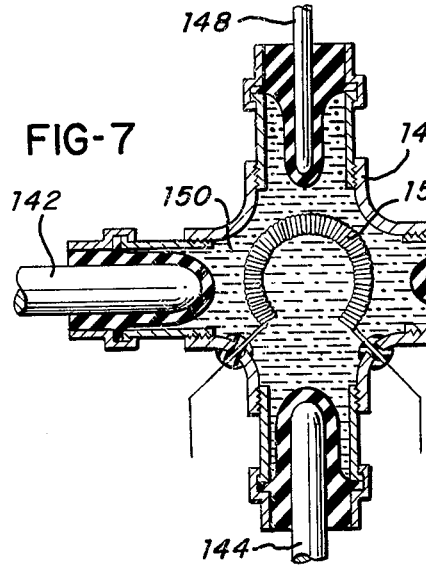
FIGURE 7 is a sectional view showing another actuator apparatus of this invention.

FIGURE 7 illustrates apparatus of this invention having a plurality of actuator rods arranged in a manner different from that shown in FIGURE 6. A container 140 has actuator rods 142, 144, 146, and 148 arranged in opposed pairs. Thermally responsive material 150 within the container 140 is heated by a heater unit 152.

If the force urging each of the rods 142, 144, 146, and 148 toward the center of the container 140 is substantially equal, upon expansion of the material 150, the rod 142 moves first, followed in sequence by rods 144, 146, and 148. However, as stated above, for determining the relative pressures of the material 150 at which each of the rods 142, 144, 146, and 148 moves, the force or pressure or load upon each rod causing resistance to movement of the rod must be considered. This factor is in addition to that of the relative abutment areas of the rods.

FIGURE 8

Figure 8:
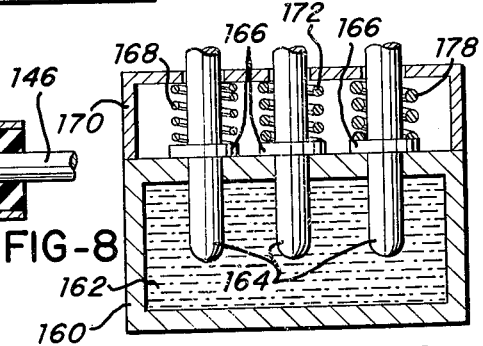
FIGURE 8 is a sectional view showing another actuator apparatus of this invention.

FIGURE 8 shows a container 160 in which there is thermally responsive material 162. Also within the container 160 are a plurality of actuator rods 164, each of which has substantially the same abutment area within the container 160 for operation thereupon by the material 162.

Each of the rods 164 has a collar 166 attached thereto. A spring 168 engages the collar 166 of one of the rods 164 and is compressed between the collar 166 and an auxiliary housing 170. The spring 168 provides a force which resists any movement of its respective rod 164. A spring 172 engages the collar 166 of another rod 164 and is compressed between the collar 166 and the housing 170. The spring 172 provides a greater force resisting movement of its respective rod 164 than does the spring 168 upon its rod 164.

A spring 178 encircles another of the rods 164 and is compressed between the collar 166 thereof and the housing 170. The spring 178 provides a greater force upon its respective rod 164 resisting movement thereof than does the spring 172 upon its rod 164.

Heat may be applied to the material 162 by any suitable means (not shown). Upon expansion of the material 162, pressure is applied to the rods 164 urging movement thereof. However, as expansion of the material 162 continues, the rod having the least force resisting movement thereof moves first. Thus, the rod 164 having the spring 168 moves first, followed by the rod 164 having the spring 172, and followed by the rod 164 having the spring 178.

Thus, it is understood that structure of this invention includes means by which the sequence of operation of the actuator members can be readily controlled.

It is also to be understood that in any apparatus of this invention the thermally responsive means thereof may be heated by any suitable means other than electrical means. The heater means may be either internal or external with respect to the container.

Thus, apparatus of this invention serves as means for accurate and precise control of one or more functions or operations.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claim.

Having thus described our invention, we claim:
Actuator apparatus comprising:
a container,
thermally responsive expansible-contractible work producing material within the container,
electric heater means within the container and in thermal transfer relationship with the thermally responsive work producing material,
an actuator rod within the container and having a portion extending therefrom, the actuator rod having an abutment portion within the container which is acted upon by the thermally responsive material during expansion thereof, the actuator rod being movable with respect to the container upon a given amount of expansion of the thermally responsive material,
a control rod within the container and having a portion extending therefrom, the control rod having an abutment portion within the container which is acted upon by the thermally responsive material during expansion thereof, the control rod being movable with respect to the container upon greater expansion of the thermally responsive material than the expansion thereof necessary for movement of the actuator rod,
electric circuit means connected to the electric heater means,
the electric circuit means including control means operable by movement of said control rod so that movement of the control rod operates the control means to change the amount of current flowing in the electric heater means and thus changes the amount of heat produced within the thermally responsive material by the electric heater means.

References Cited by the Examiner
UNITED STATES PATENTS

| | | | |
|---|---|---|---|
| 1,115,545 | 11/14 | Hynes | 60—23 X |
| 1,936,602 | 11/33 | Karg | 92—50 |
| 2,153,637 | 4/39 | Niven et al. | 60—52 X |
| 2,512,212 | 6/50 | Molotzak | 60—23 |
| 2,928,233 | 3/60 | Kimm | 60—23 |
| 2,943,327 | 7/60 | Juilfs | 92—75 X |
| 3,016,691 | 1/62 | Asakawa | 60—23 |
| 3,075,348 | 1/63 | Baker | 60—23 |

JULIUS E. WEST, *Primary Examiner.*

ROBERT R. BUNEVICH, *Examiner.*